Jan. 27, 1970 W. ULLMANN ETAL 3,492,593
ADJUSTABLE PULSE GENERATOR PARTICULARLY FOR
ELECTRO-EROSION METAL WORKING
Filed April 20, 1964 2 Sheets-Sheet 1

INVENTORS:
Werner Ullmann &
Franco Donati
BY
Werner W. Kleeman
ATTORNEY

INVENTORS:
Werner Ullmann &
BY Franco Donati
Werner W. Kleeman
ATTORNEY 3,492,593

ADJUSTABLE PULSE GENERATOR PARTICULARLY FOR ELECTRO-EROSION METAL WORKING

Werner Ullmann, Locarno-Orselina, and Franco Donati, Locarno, Switzerland, assignors to A.G. für Industrielle Elektronik Agie, Locarno, Switzerland, a corporation of Switzerland Filed Apr. 20, 1964, Ser. No. 360,808
Claims priority, application Switzerland, Apr. 26, 1963, 5,258/63
Int. Cl. H03k *1/00*
U.S. Cl. 328—59 5 Claims

ABSTRACT OF THE DISCLOSURE

An adjustable pulse generator, particularly for electro-erosion machining is disclosed. The generator comprises an astable multivibrator means for generating pulses having a constant interpulse pause ratio and a given repetition frequency. Mono-stable multivibrator means are connected to the astable multivibrator means and are operative in response to the pulses generated thereby, the mono-stable multivibrator means producing pulses having the given repetition frequency and an adjustable interpulse pause ratio. The mono-stable multivibrator means includes means for selecting predetermined interpulse pause ratios. Adjusting means are coupled with the astable multivibrator means and with the mono-stable multivibrator means for simultaneously adjusting both the astable multivibrator means and the mono-stable multivibrator means such that the given repetition frequency of the pulses generated by the astable multivibrator means is varied while the interpulse pause ratio of the pulses produced by the mono-stable multivibrator means is maintained at a predetermined ratio as selected.

The present invention has reference to an advantageous further improvement as well as application of the generator described in our co-pending United States application, Ser. No. 314,144, now Patent No. 3,264,517, filed Oct. 7, 1963 and entitled "Generator For Electro-Erosion Metal Working."

The inventive generator of the aforementioned patent application is characterized by the features that, the electric circuit incorporates a pulse generator provided with reduction stages for discrete pulse repetition frequencies of similar interpulse pause ratios, means for generating unlike interpulse pause ratios, and wherein a subsequently coupled selector device controls a switching circuit by means of these unlike ratios in such a manner that with constant pulse repetition frequency there appears changeable pulse repetition ratios which, in turn, subsequently act upon a power output circuit.

The present invention is characterized by the features that the means for generating unlike or dissimilar interpulse pause ratios connected at the output side of the pulse generator incorporates a monostable multivibrator and two inverter stages. Additionally, the generator of the present invention is employed with electro-erosion tool machines in which in addition to the normal feed movement of the tool electrode there is superimposed a vibration. With the present invention the electric parameters such as for example amplitude, pulse width, interpulse pause, relation or ratio between pulse width and interpulse pause as well as the repetition frequency of the pulse width are selected freely and independently of one another.

It is, therefore, an important object of the present invention to provide an improved generator of the aforementioned type which, among other things, permits of adjustment of the pulse width, interpulse pause and pulse repetition frequency independently of one another.

A further noteworthy object of the present invention is the provision of an improved electric circuit for superimposing vibrations only at predetermined times upon a tool electrode experiencing feed movement, and particularly in response to operating conditions at the erosion gap.

Other features, objects and advantages of the invention will become apparent by reference to the following detailed description and drawings in which.

Figure 3:
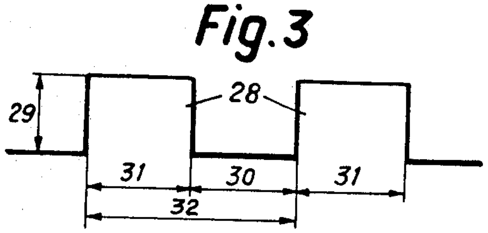
Figure 4:
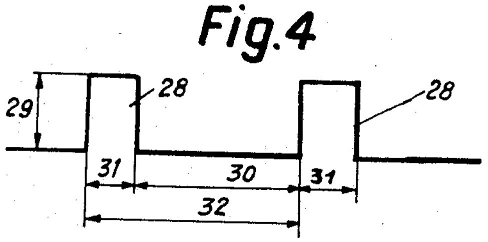
Figure 5:
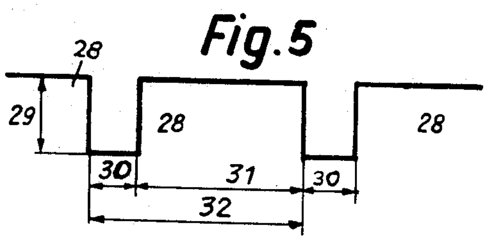
Figure 6:
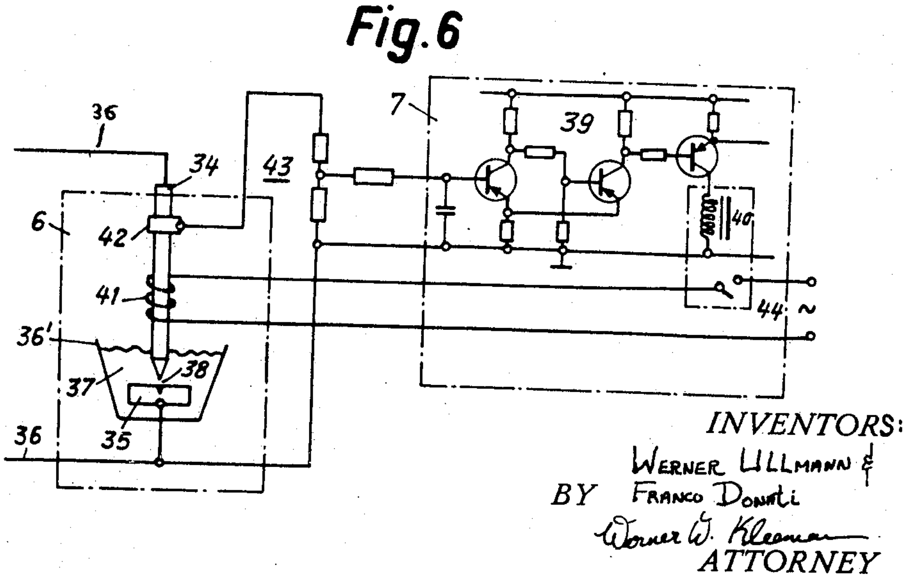

FIGURE 3 diagrammatically illustrates impulses as such arrive at the monostable multivibrator;

FIGURE 4 diagrammatically illustrates impulses as such appear at the output of the monostable multivibrator;

FIGURE 5 diagrammatically illustrates impulses as such are available at the output of the inverter; and FIGURE 6 illustrates a portion of an electro-erosion tool machine provided with an automatic vibrator for displacing the tool electrode.

Figure 1:
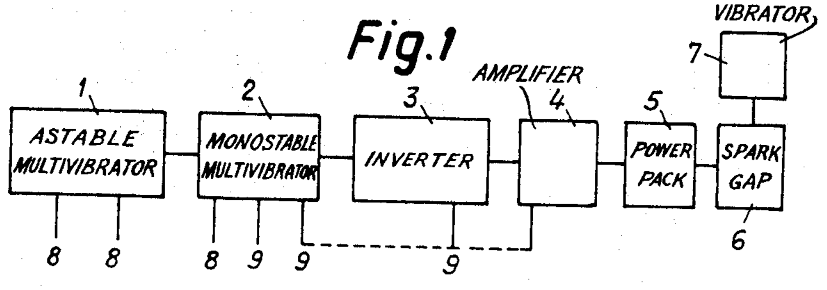
FIGURE 1 is a block diagram of the inventive generator.

Describing now the drawings, and, more specifically, a general description of the inventive arrangement, it will be seen that in the block diagram of FIGURE 1 the astable multivibrator is designated by reference numeral 1. This multivibrator 1 serves to generate pulses possessing a given repetition frequency. This astable multivibrator 1 acts upon a monostable multivibrator 2 provided for controlling the interpulse pause ratio. Furthermore, the inverter or inverter circuit is designated by reference numeral 3. The pulses coming from the inverter 3 arrive at an amplifier 4 and then at the power output stages and power transistor packs 5. The subsequent stage consists of the spark or erosion gap 6. An automatic vibrator 7 is connected in circuit with a work electrode 34 (FIGURE 6) in a manner such that it subjects this work electrode during the electro-erosion metal working operation to vibrational movement to and from the workpiece 35. At the astable multivibrator 1 and with the aid of the switch circuit 8, as will subsequently be more fully expained, there are connected suitable capacitors conveniently designated herein as capacitors of a first type 10 to 18. At the monostable multivibrator 2 and with the aid of the switch circuit 8 there are also connected other suitable capacitors, conveniently designated herein as capacitors of a second type 19 to 27. Resistors R1 to R5 are connected in circuit with the monostable multivibrator 2 through the agency of the switch circuit 9. The same switch circuit 9 taps the pulses of desired interpulse pause ratio from the inverter 3 and delivers them to the amplifier 4. Such is symbolically illustrated in FIGURE 1.

Figure 2:
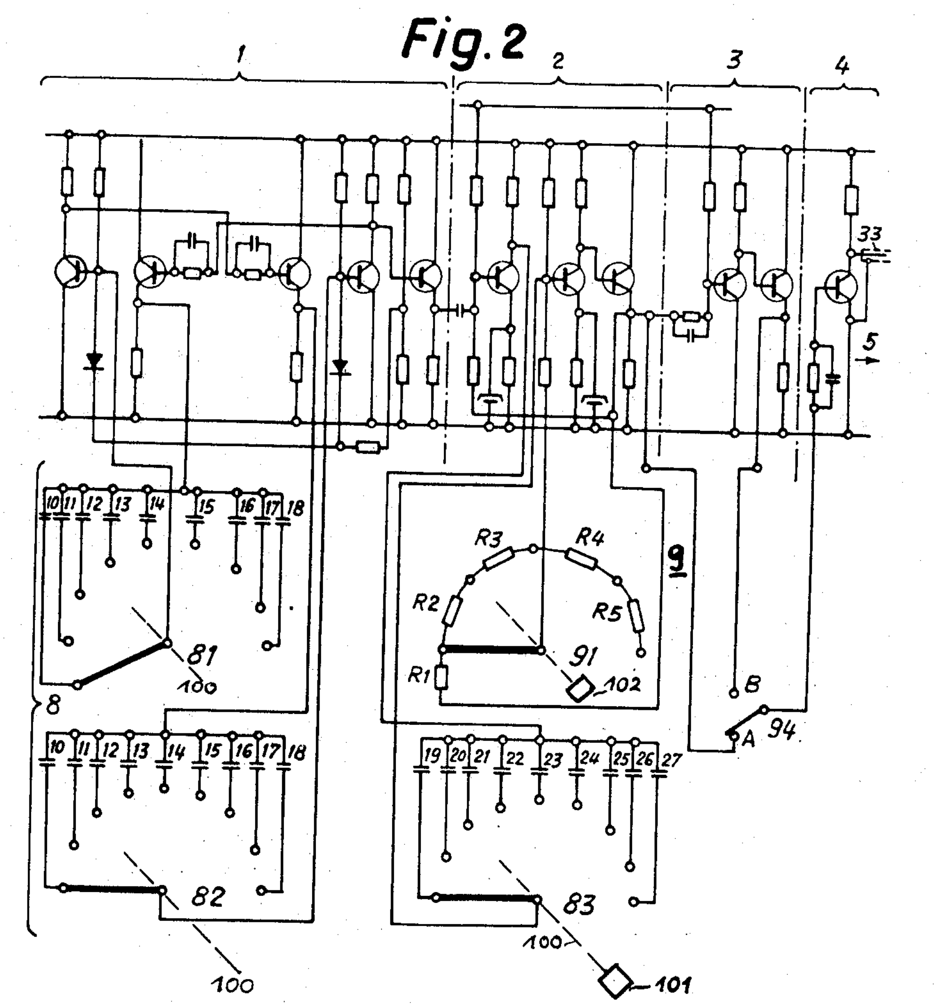
FIGURE 2 illustrates embodiment of electric circuit for pulse control.

Directing attention now to FIGURE 2, it will be seen that the astable multivibrator 1 is controlled by the switch circuit 8. The switch circuit 8 incorporates three switch assemblies or rotary switches 81, 82 and 83. The rotary switch or contactor 81 contacts capacitors of a first variety generally designated by reference numerals 10 to 18. The rotary switch or contactor 82 also contacts capacitors of the first variety, likewise again designated by numerals 10 to 18. On the other hand, the rotary switch or contactor 83 is provided to contact capacitors of a second variety, generally designated by reference numerals 19 to 27.

By means of the rotary switches 81 and 82 the frequencies of the astable multivibrator 1 are changed. This occurs by switching-in the capacitors 10 to 18. The rotary switch 83 acts upon the monostable vibrator 2 at which are connected in circuit the capacitors 19 to 27. The latter serves to accommodate or adjust the monostable multivibrator 2 to the astable multivibrator 1. The three rotary switches or contactors 81, 82 and 83 which for example can be mounted upon a common shaft are commonly actuated from a single switch; this means in effect that, for example, to the capacitor 10 of the first type there is fixedly associated the capacitor 19 of the second type. As a further illustrative example there is indicated that the capacitor 27 is fixedly associated with the capacitor 18.

It is also possible to visualize that capacitors 10 to 18 may be in the form of a single capacitor constructed as a variable or rotating plate condenser. Due to the last-mentioned measure there is guaranteed that a continuous change of the capacitance can be undertaken. The same holds true also for the capacitors 19 to 27. By means of the rotary switches or contactors 81, 82 and 83 there is undertaken an adjustment of the desired pulse repetition frequency at the astable multivibrator 1 as well as also at the same time an accommodation or tuning of the monostable multivibrator 2 to the astable multivibrator 1. As previously explained, the three rotary switches 81, 82, 83 can be mounted upon a common shaft schematically indicated by numeral 100 in FIGURE 2 and are conveniently actuated from a single switch or actuating member 101.

Now, the switch circuit 9 embodies a switch assembly or rotary switch 91. By means of this rotary switch 91 it is possible to select the resistor R1, R2, R3, R4 and R5. In so doing, the interpulse pause ratio is changed at the monostable multivibrator 2. It will be appreciated that with the illustrated arrangement it is possible to thus select five unlike or dissimilar interpulse pause ratios without the pulse repetition frequency changing. Quite obviously, the rotary switch or contactor 91 can also exhibit more than five resistors so that a larger number of unlike and different pulse ratios can be selected. The aforesaid rotary switch 91 can also be constructed as a potentiometer for instance. The pulse train which can be adjusted by means of the rotary switch 91 arrives, on the other hand, at the inverter 3 and, on the other hand, at the contact A of the selector or change-over switch 94. The output of the inverter 3 is applied to the contact B of the aforesaid selector switch 94. As a result, there is provided the possibility that either the direct output from the monostable vibrator 2 (switch 94 at contact A), or the output from the inverter 3 (180° phase-displaced) arrives at the amplifier 4 via the selector or change-over switch 94 which is then lying against contact B. Thus, only the series of pulses from the output of the monostable multivibrator 2 or only the series of pulses from the output of the inverter 3 can arrive at the amplifier 4, depending upon the position of selector switch 94. The rotary switch 91 is actuated by means of a single switch 102 (FIGURE 2). This single switch 102 can be constructed, for example, such that by pushing upon such switch the selector switch 94 is brought into the desired position (A or B).

Amplifier 4 is provided with an adjusting or matching element for accommodation to the impedance of the coaxial cable 33. This coaxial cable 33 is connected with power transistor packs 5. The subsequent structural elements, namely the spark gap 6 and the automatic vibrator 7 are already known in their general operation and/or described in the aforementioned co-pending application so that further details thereof are not believed necessary, although the physical structure of the automatic vibrator circuit will be considered as the description proceeds.

FIGURE 3 illustrates a pulse wave or train incorporating both of the pulses 28 possessing the pulse amplitude 29. The interpulse pause is designated by reference numeral 30, the pulse width by numeral 31 and the period of the pulse repetition frequency by numeral 32. The ration of the pulse width 31 to the interpulse pause 30 in this instance amounts to the value 1. The astable multivibrator 1 delivers the pulses in this form for example to the monostable multivibrator 2.

FIGURE 4 schematically illustrates the relationship of pulse width 31 to interpulse pause 30 after an appropriate switching-in of one or more resistors R1 to R5 by means of the rotary switch 91 has changed the interpulse pause ratio in the monostable multivibrator 2. In the illustrated embodiment five different interpulse pause ratios or relationships can be generated, of which only one example has been illustrated in FIGURE 4. A comparison of FIGURES 3 and 4 should make it apparent that the pulse repetition frequency has not changed. Thus, the period 32 has remained constant. The pulses arrive in this form at the amplifier 4 via the contact A of the selector or change-over switch 94 and from there arrive at the power transistor packs 5 and spark or erosion gap 6.

FIGURE 5 illustrates the form of a series of pulses as such appear at the output of the inverter 3. Hence such figure depicts a phase displacement of 180° with respect to FIGURE 4. If, now, the change-over switch 94 is switched over to contact B due to actuating the control knob or actuating button 102, then the series of pulses depicted in FIGURE 5 reach the amplifier 4, from there arrive at the aforementioned further structural elements 5 and 6. In FIGURE 5 the amplitude is designated by reference charactre 29, the pulse width by 31, the period of the pulse repetition frequency by 32 and the interpulse pause by 30. From this figure it will be recognized that the pulse width 31 is considerably larger than half of the period of the pulse repetition frequency 32. It is to be taken into consideration that with the pulse shapes illustrated in FIGURES 3, 4 and 5 in all three cases there appears the same magnitude of the period of the repetition frequency 32.

FIGURE 6 depicts a small portion of an electro-erosion tool machine corresponding to the spark gap 6 provided with the automatic vibrator 7 of the block diagram of FIGURE 1. The erosion or spark gap 6 incorporates a tool electrode 34 and a workpiece 35. Both of these elements are connected via the conductors 36 with the power output stage and the power transistor packs 5 of FIGURE 1. The tool electrode 34 and the workpiece 35 are accommodated or housed in a vessel 36', filled with a suitable dielectric working medium or fluid 37, and are separated from one another by the spark gap 38.

The automatic vibrator 7 comprises in its essential components a Schmitt-trigger 39, a relay 40 which, in turn, controls a coil 41 operably associated with the tool electrode 34. The tool electrode 34 exhibits a tap 42 which is connected through the agency of a voltage divider 43, connected at one end to the workpiece 35, with the Schmitt-trigger 39 of the automatic vibrator 7.

The mode of operation of the invention will now be described more fully in conjunction with FIGURES 1 to 6: The astable multivibrator 1 generates different pulse repetition frequencies through the selection of different switchable capacitors 10 to 18 of both rotary switches 81, 82. This capacitance is adjusted by means of switch circuit 8 as previous explained. The repetition frequencies can be varied in this manner within a large frequency range in accordance with the operating or working requirements at the spark gap 6. The capacitors 19 to 27 of the rotary switch 83 are appropriately adjusted simultaneously upon actuation of the switch circuit 8. Consequently, the monostable multivibrator 2 is accommodated to the desired frequency of the astable multivibrator 1. As already mentioned, the rotary switches 81, 82, 83 are arranged upon a single actuation shaft 100 so that all three switches can always be simultaneously changed by means of a rotatable control or actuating knob 101.

The series of pulses illustrated in FIGURE 3 arrive at the monostable multivibrator 3 which effects a change of the relationship of pulse width to pulse pause. This occurs in that the appropriate resistors R1 to R5 are switched-in by means of the rotary switch 91. It will be recalled, the repetition frequency is thereby not changed. Due to the regulation with the rotary switch 91 the pulse width 31 is controlled from half of the period as illustrated in FIGURE 3 up to a very small value. This is depicted in FIGURE 4. The last-mentioned series of pulses are delivered to the contact A of the selector or change-over switch 94 and arrive, as already described in conjunction with FIGURE 2, at the output amplifier 4, and further at the subsequent structural components 5 and 6. As long as the change-over switch 94 is in the position depicted in FIGURE 2 the monostable multivibrator 2 is directly connected via the contact A of such change-over switch 94 with the amplifier 4. Once again it is mentioned that the advantageous physical construction of the present invention is, however, not limited to the five resistors R1–R5. If further interpulse pause ratios are required for the electro-erosion metal working operation then it is readily possible to increase the number of resistors. In the present embodiment the description has been limited to a total of five resistors merely by way of illustration and for purposes of simplifying the description.

Now, on the other hand, if the five different interpulse pause ratios or relationships according to the illustrated example are tapped off the output of the inverter 3 (contact-position B), then there results a series of pulses displaced 180° in phase, as such has been illustrated in FIGURE 5. As should be remembered, such takes place via the change-over switch 94 (contact B). In this manner there are available ten different interpulse pause ratios, depending upon the location of change-over switch 94, so that in accordance with operating conditions prevailing at the spark gap 6, ten different interpulse pause ratios can be adjusted only with the help of the control switch or actuating knob 102. It must once again be mentioned that the pulse repetition frequency does not change. Such pulse repetition frequency is adjusted by means of the switch circuit 8.

The present invention thus provides a generator which in comparison with the generator described in the herein mentioned co-pending application is simpler as regards construction, placing into operation and servicing the apparatus. Likewise, the generator of the present invention permits a saving of quality components, making itself readily felt in the price of the equipment. The capacitors 10–18 and 19–27 as well as the resistors R1 to R5 can be advantageously constructed as printed circuits. In this manner it is possible to accommodate in a simple way the electric parameters such as pulse width, interpulse pause nad pulse repetition frequencies in dependence upon the operating conditions and the workpiece to be processed or machined. This simplified generator can also be employed in the same manner as the generator described in the aforementioned co-pending application.

There will now be briefly described the utilization of the inventive generator in accordance with FIGURE 6. With different electro-erosion tool machines the work electrode, such as electrode 34, in addition to the normal feed movement, has imparted to it a vibration of small amplitude (several hundredths of a millimeter to several tenths of a millimeter). This vibration can in known manner be generated electro-mechanically, hydraulically, electromagnetically and mechanically. In the illustrated embodiment depicted in FIGURE 6 such is produced electromagnetically.

The apparatus of the automatic vibrator 7 mainly serves to improve the circulation of the dielectric fluid 37 and also to transport away the metal particles freed from the workpiece 35 during spark erosion. With previously known prior art electro-erosion tool machines the vibration occurred during the entire working operation. As a result, it was possible to achieve in known manner a better erosion or material removal efficiency and a smaller electrode wear. Of course, several disadvantages had to be taken into consideration. Since the spacing between tool electrode 34 and workpiece 35 due to the vibration oscillates within the magnitude of the vibration amplitude, the optimum material removal or erosion efficiency is provided for only during a very short period of time. This occurs during passage of the electrode 34 through the adjusted reference or nominal value of the spark gap 38. A further disadvantage resides in the fact that in actual practice too strong a vibration increases electrode wear.

The present generator strives to overcome these disadvantages, in particular in that the vibration no longer takes place during the entire working operation, rather only during predetermined times. This will now be more fully explained:

Thus, if the voltage at the spark or erosion gap 38 should drop for any reason below a value set at the Schmitt-trigger 39, for example due to soiling or because of too large a feed motion of the electrode 34, then relay 40 will be switched-in by the aforesaid trigger circuit 39. The voltage change is delivered from the electrode 34 via the tap 42 and the voltage divider 43 to the Schmitt-trigger 39. The relay 40 delivers an alternating current voltage 44 to the coil 41 so that the tool electrode 34 vibrates. In this manner such electrode 34 is only placed into oscillation or vibration at the moment such is necessary due to dropping of the voltage. As soon as the reference voltage is at least again reached the vibration or oscillation automatically cuts-off.

Additionally, this installation prevents the tool electrode 34 being short-circuited with the workpiece 35 and brings the conditions at the spark gap 38 in the shortest time back into the optimum and base adjustment. Therefore, there results in an advantageous manner that the removal volume increases, the electrode wear decreases, and on account of the greater stability of the electrode control there is achieved preciser operating results.

While there is shown and described present preferred embodiments of the invention it is to be distinctly understood that the invention is not limited thereto but may be otherwise variously embodied and practised within the scope of the following claims.

What is claimed is:

1. A generator, particularly for electro-erosion machining, said generator comprising:

astable multivibrator means for generating pulses having a constant interpulse pause ratio and a given repetition frequency;

mono-stable multivibrator means connected to said astable multivibrator means and operative in response to said pulses generated thereby, said mono-stable multivibrator means producing pulses having said given repetition frequency and an adjustable interpulse pause ratio;

said mono-stable multivibrator means including means for selecting predetermined interpulse pause ratios; and, adjusting means coupled with said astable multivibrator means and with said mono-stable multivibrator means for simultaneously adjusting both said astable multivibrator means and said mono-stable multivibrator means such that the given repetition frequency of said pulses generated by said astable multivibrator means is varied while the interpulse pause ratio of said pulses produced by said mono-stable multivibrator means is maintained at a predetermined ratio as selected.

2. A generator as defined in claim 1, wherein said means for selecting a predetermined interpulse pause ratio comprises variable resistance means.

3. A generator as defined in claim 2, wherein said adjusting means comprises: first variable capacitance means connected to said astable multivibrator means for varying the repetition frequency of pulses generated thereby; second variable capacitance means connected to said mono-stable multivibrator means and coupled with said variable resistance means, said second variable capacitance means being variable simultaneously with said first variable capacitance means by a single actuating means, wherein the interpulse pause ratio selected by said resistance means is maintained during the varying of the repetition frequency of pulses generated by said astable multivibrator means.

4. A generator as defined in claim 3, further including inverter means; and switch means cooperating with said variable resistance means and with said inverter means for varying the resistance of said variable resistance means and for selectively coupling said inverter means to said mono-stable multivibrator means.

5. Generator for electro-erosion machining as defined in claim 4 including amplifier means disposed at the output side of said inverter means, said switch means also selectively coupling said inverter means with said amplifier means.

References Cited

UNITED STATES PATENTS

| | | | |
|---|---|---|---|
| 2,429,186 | 10/1947 | Johnson et al. | 219—111 |
| 3,191,067 | 6/1965 | Zimmerman | 307—88.5 |
| 3,191,071 | 6/1965 | King et al. | 307—88.5 |
| 3,243,567 | 3/1966 | Lobur | 219—69 |
| 3,244,909 | 4/1966 | Henderson | 307—88.5 |
| 3,263,222 | 7/1966 | Coleman et al. | 340—174.1 |

FOREIGN PATENTS

| | | |
|---|---|---|
| 759,190 | 10/1956 | Great Britain. |

DONALD D. FORRER, Primary Examiner

S. D. MILLER, Assistant Examiner

U.S. Cl. X.R.

219—69; 307—265, 271, 273; 331—52, 54, 113